(12) United States Patent
Sumada et al.

(10) Patent No.: US 6,603,393 B2
(45) Date of Patent: Aug. 5, 2003

(54) DISPLAY DEVICE FOR VEHICLES

(75) Inventors: Takashi Sumada, Saitama (JP); Yoshifumi Mochizuki, Saitama (JP); Koji Kano, Saitama (JP); Koji Suzuki, Saitama (JP); Koichi Shimamura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,651

(22) Filed: Mar. 30, 2001

(65) Prior Publication Data

US 2001/0026217 A1 Oct. 4, 2001

(30) Foreign Application Priority Data

Mar. 31, 2000 (JP) ........................................ 2000-098296

(51) Int. Cl.⁷ ................................................ B60Q 1/00
(52) U.S. Cl. ................... 340/425.5; 340/427; 340/438; 340/461; 340/545.6; 340/691.6
(58) Field of Search ............................ 340/425.5, 427, 340/428, 438, 459, 461, 545.6, 545.7, 457, 691.6, 686.1, 687; 362/473, 489

(56) References Cited

U.S. PATENT DOCUMENTS 4,555,694 A * 11/1985 Yanagishima et al. ...... 340/524
4,839,749 A * 6/1989 Franklin ...................... 360/12
4,988,996 A * 1/1991 Ito .............................. 340/984
5,038,135 A * 8/1991 Jurkiewicz et al. ......... 340/457
5,250,849 A * 10/1993 Periou ....................... 307/10.1
5,648,755 A * 7/1997 Yagihashi ................... 340/439
5,949,330 A * 9/1999 Hoffman et al. ............ 340/438
6,275,231 B1 * 8/2001 Obradovich ................ 345/349

FOREIGN PATENT DOCUMENTS

| DE | 41 40 864 A1 | 6/1992 |
| DE | 43 15 645 A1 | 11/1994 |
| JP | 448655 | 7/1992 |

* cited by examiner

*Primary Examiner*—Daniel J. Wu
*Assistant Examiner*—Toan Pham
(74) *Attorney, Agent, or Firm*—Birch, Stewart, Kolasch & Birch, LLP

(57) ABSTRACT

The invention provides a display device for vehicles capable of quickly and reliably displaying high-priority and high-emergency information, while maintaining sufficient display space for other information. The vehicles may be of the type including a trunk provided with a cover. The display device has a display section in which display patterns are used. The display device includes an open position detecting device which detects that the cover of the trunk is open. A warning design pattern producing device generates a warning design pattern which visually expresses a warning when the cover is open. A warning display priority device displays the warning design pattern, prior to other information, on the display section when the cover is detected to be open.

19 Claims, 9 Drawing Sheets

DISPLAY DEVICE FOR VEHICLES

BACKGROUND OF THE INVENTION

1. Field of the Invention

The present invention relates to a display device for vehicles and, more particularly, to a display device which is mounted on a vehicle provided with a trunk. When the cover of the trunk is open, the display device displays information indicating the open state of the cover prior to the display of other information.

2. Description of the Background Art

A vehicle is typically equipped with a display device which displays information required by a rider (or driver). The information displayed has recently become diversified with improvements in the capacity of a microcomputer and a liquid crystal display device. In Japanese Patent Publication No. Hei 4-48655 for example, a maintenance period display device is disclosed which detects a traveling time or a distance traversed, then compares a result of the detection with preset maintenance information, and then displays the information on the maintenance period.

The display device displays not only such low-priority or low-emergency information such as a driving condition of the vehicle, or an operating condition of an air conditioner or audio system, but also displays high-emergency information that the rider (or driver) is required to recognize immediately.

If a large display space is continuously provided in the display section for high-emergency information, the information is easily recognizable. However, there will only be a small display space remaining for other information. In contrast, when display space is allocated equally irrespective of the quality of emergency of the information, it will become difficult to quickly and reliably recognize high-priority or high-emergency information.

SUMMARY OF THE INVENTION

It is therefore an object of the present invention to provide a display device for vehicles which is capable of solving the above-described technical problems, which quickly and reliably recognizes high-priority or high-emergency information, and provides a sufficient display space for other kinds of information.

To attain the above-described object, this invention provides a display device for a vehicle which is mounted on a vehicle having a trunk provided with a cover body. The display device has a display section on which an unlimited display pattern may be displayed. The display device includes an open state detecting means which detects when the cover body is open, a warning design pattern generating means which generates a visual warning design pattern for warning that the cover body is open, and a warning display priority means which displays the warning design pattern on the display section prior to other information when the open state of the cover body is detected.

When the open state of the trunk cover body is detected, the warning design pattern is displayed on the display screen of the display device indicating that the cover body is open, prior to the display of ordinary information such as vehicle operation information. Therefore, the rider can see quickly and exactly that the cover body is open. Furthermore, when the cover body is in a closed position, no warning design pattern is displayed. Therefore, neither the display of other information will be disturbed nor the display space for other information will decrease.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
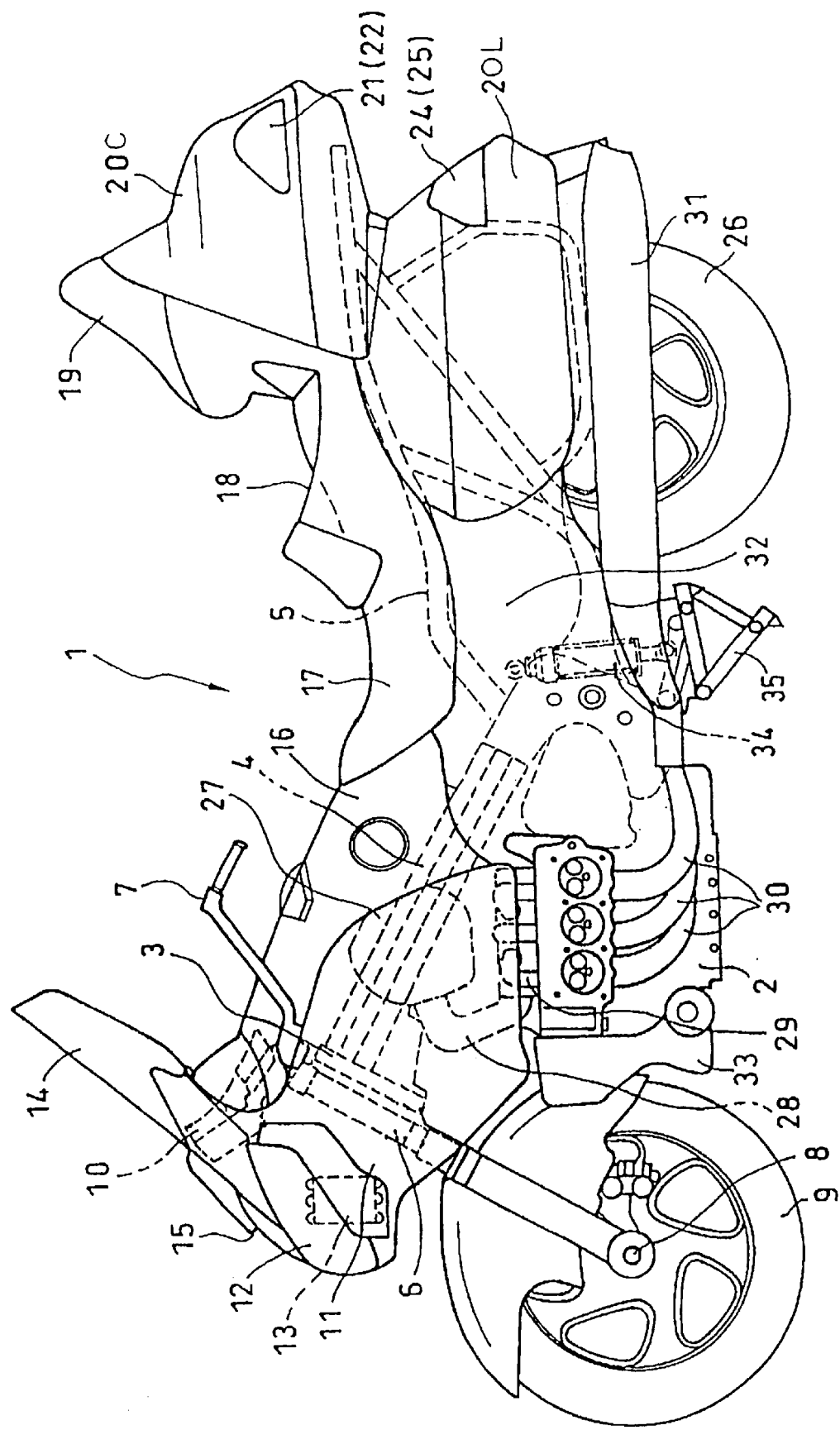
FIG. 1 is a side view of a motorcycle mounted with a display device for vehicles according to this invention.

A preferred embodiment of a display device for vehicles according to this invention will now be described with reference to the accompanying drawings. FIG. 1 is a side view showing the external appearance of a motorcycle mounted with a display device according to the one preferred embodiment of this invention. In the drawing, the motorcycle 1 (hereinafter referred to as the vehicle) is mounted with a horizontal opposed six-cylinder engine 2.

The frame structure of the vehicle is comprised of a twin-frame type main frame 4 which is bifurcated to right and left frames extending rearwardly from a steering head 3, and a rear frame 5 connected to the rear end of the main frame 4. A front fork 6 composed of two pipes is arranged on the right and left sides in the direction of travel, and is installed to the steering head 3. The front fork 6 is thus rotatable in the steering direction.

A handlebar 7 is secured on the upper part of the steering head 3, on the top bridge. A front wheel axle 8 is mounted at the lower end of the front fork 6. A front wheel 9 is rotatably supported on the front wheel axle 8.

A meter unit 10 is mounted forwardly of the handlebar 7. A lens surface (clear lens) 12 of a lighting device is attached at the front of a front fairing (cowling) 11 which covers the front part of the vehicle 1. A ballast 13 is housed inside of the front cowling 11 for a discharge lamp used as the lighting device. A windshield 14 is installed above the front cowling 11, and an air inlet port 15 is formed near the mounting portion of the windshield 14.

A fuel tank 16 is mounted on the main frame 4. A rider's seat 17 and a pillion seat 18 are arranged to the rear of the fuel tank 16. The rider's seat 17 and the pillion seat 18 are mounted on the rear frame 5. The pillion seat 18 is formed unitarily with the rider's seat 17, and has a backrest 19. A rear trunk 20C is provided behind the backrest 19. A rear stop light 21 and a blinker light 22 are also mounted behind the rear trunk 20C. Side trunks 20L and 20R are mounted beneath the rear trunk 20C on the right and left of the rear wheel 26. A set of rear stop lights 24 and blinker lights 25 are mounted at the rear of the side trunks 20L and 20R.

An air cleaner 27 is mounted forwardly of the lower part of the fuel tank 16. An intake manifold 29 extends from a throttle body 28 mounted in front of the air cleaner 27. The intake manifold 29 is connected to each of three cylinders oppositely arranged on both the right and left sides of the vehicle. A fuel injection system (not shown) is located upstream of each of these cylinders. An exhaust manifold 30 is installed from the engine 2 toward the rear. The exhaust manifold 30 is connected to a muffler 31.

Both sides under the rider's seat 17 are covered with side covers 32, and a front lower cowling 33 is located at the front of the engine 2. A rear cushion 34 is disposed under the rider's seat 17. The rear cushion 34 is connected to a hydraulic unit (not shown) which is capable of electrically adjusting the spring force to provide the initial weight application to the suspension according to the rider's weight. The vehicle 1 can be supported up on a stand 35.

Figure 2:
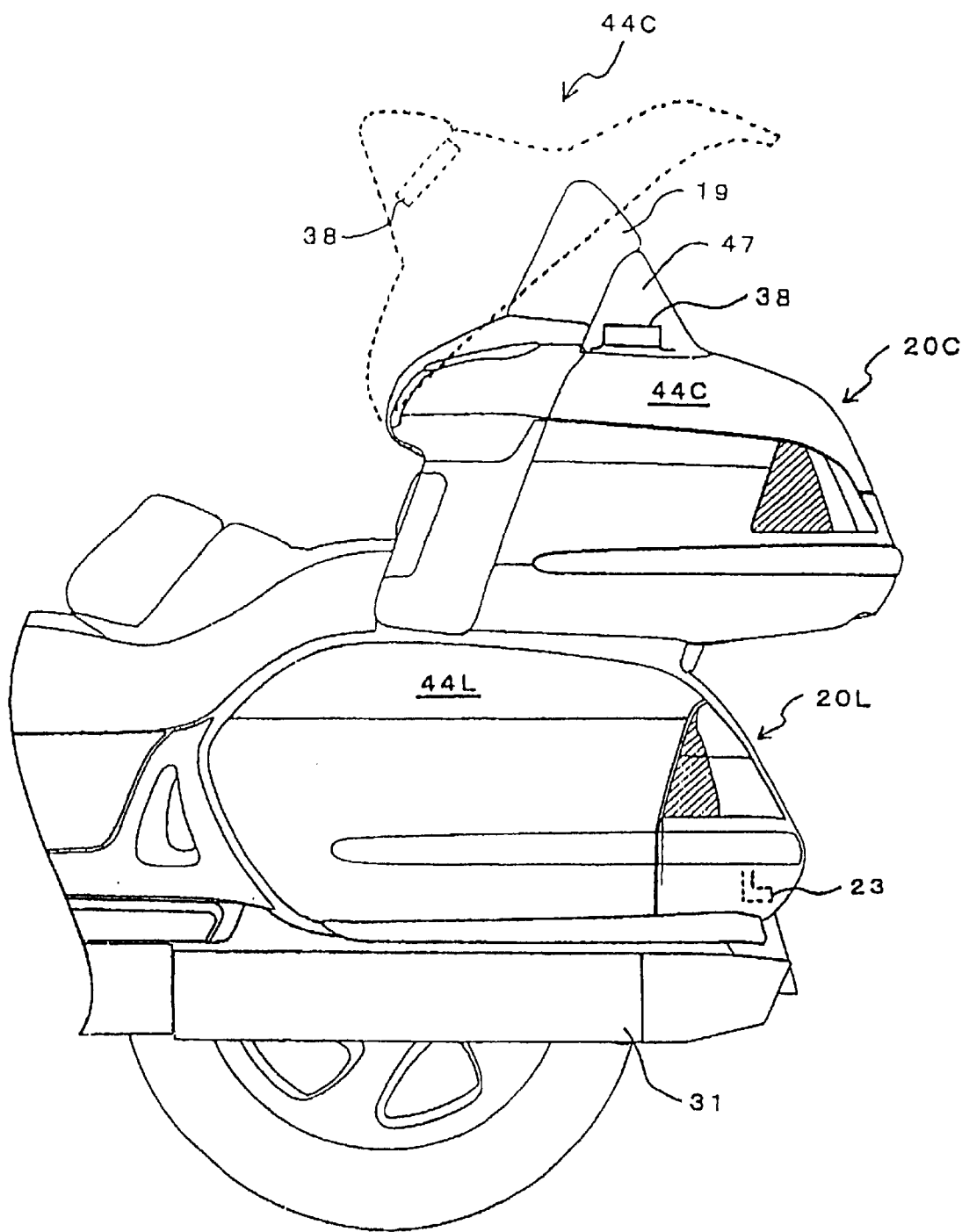
FIG. 2 is a side view showing in detail the vicinity of the rear part of the vehicle of FIG. 1.
Figure 3:
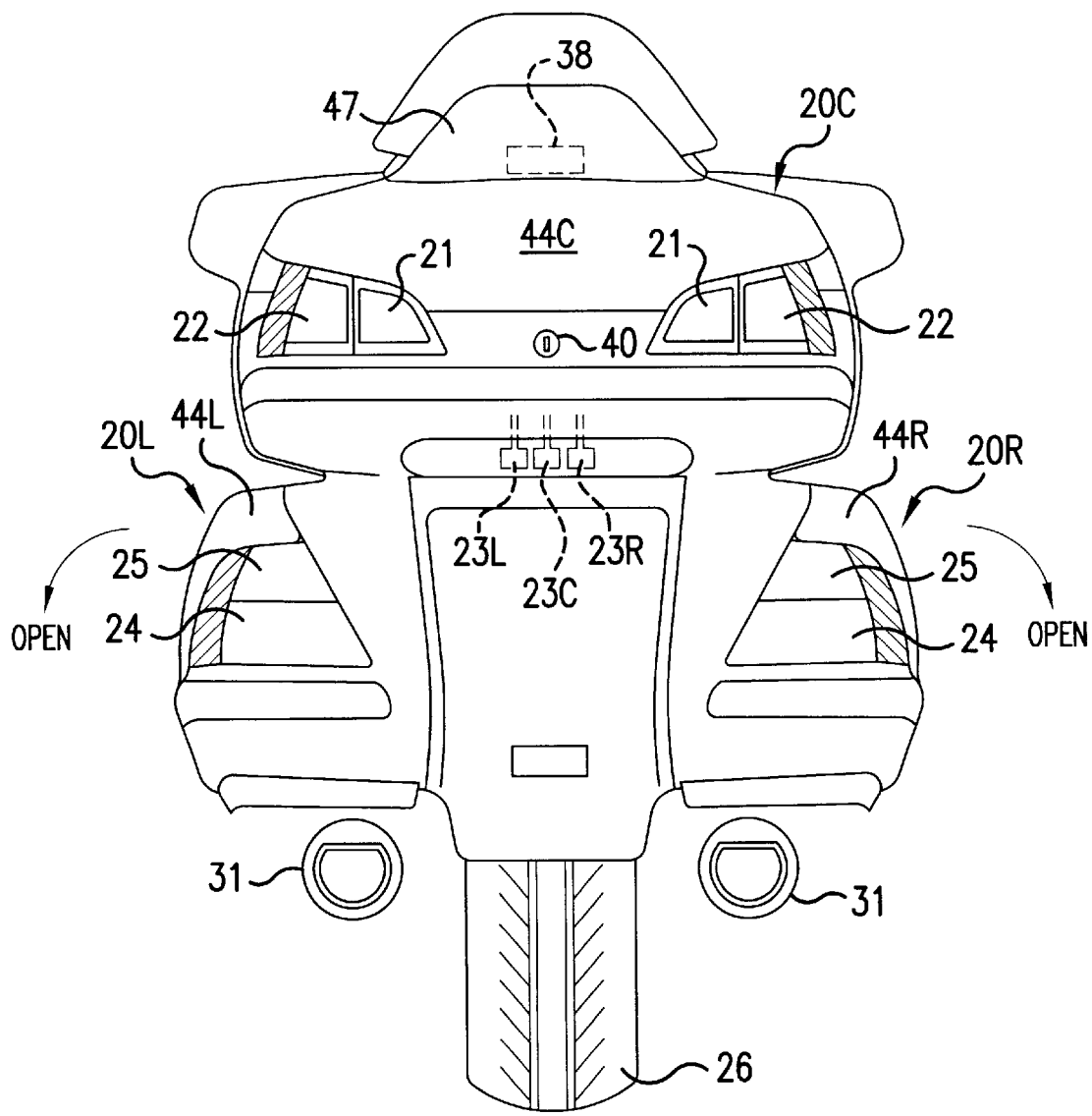
FIG. 3 is a rear view of the vehicle of FIG. 1.

As shown in FIG. 2, the cover 44C of the trunk 20C opens upwardly. As shown in FIG. 3, the covers 44L and 44R of side trunks 20L and 20R open sidewardly. The opening and closing operations of the cover 44C and the covers 44L and 44R are detected by the cover open-close sensors 39C, 39L and 39R, respectively, (not shown in FIGS. 1, 2 and 3) explained later with reference to FIG. 5.

Locking and unlocking each of the trunks 20C, 20L and 20R is performed by inserting the ignition key into a key cylinder 40 (see FIG. 3) and turning the ignition key. In the present embodiment, it is possible to remotely lock and unlock the trunks 20C, 20L and 20R by wireless remote control. For this purpose, a controller 38 with a built-in wireless signal receiving function and a lock/unlock actuator are mounted on the vehicle.

Three opening-closing levers 23L, 23C and 23R are provided beneath the rear trunk 20C as shown in FIG. 3. When the opening-closing levers 23L, 23C and 23R are operated after unlocking by the ignition key or by remote control, the cover 44L of the side trunk 20L, the cover 44C of the rear trunk 20C, and the cover 44R of the side trunk 20R are opened.

Figure 4:
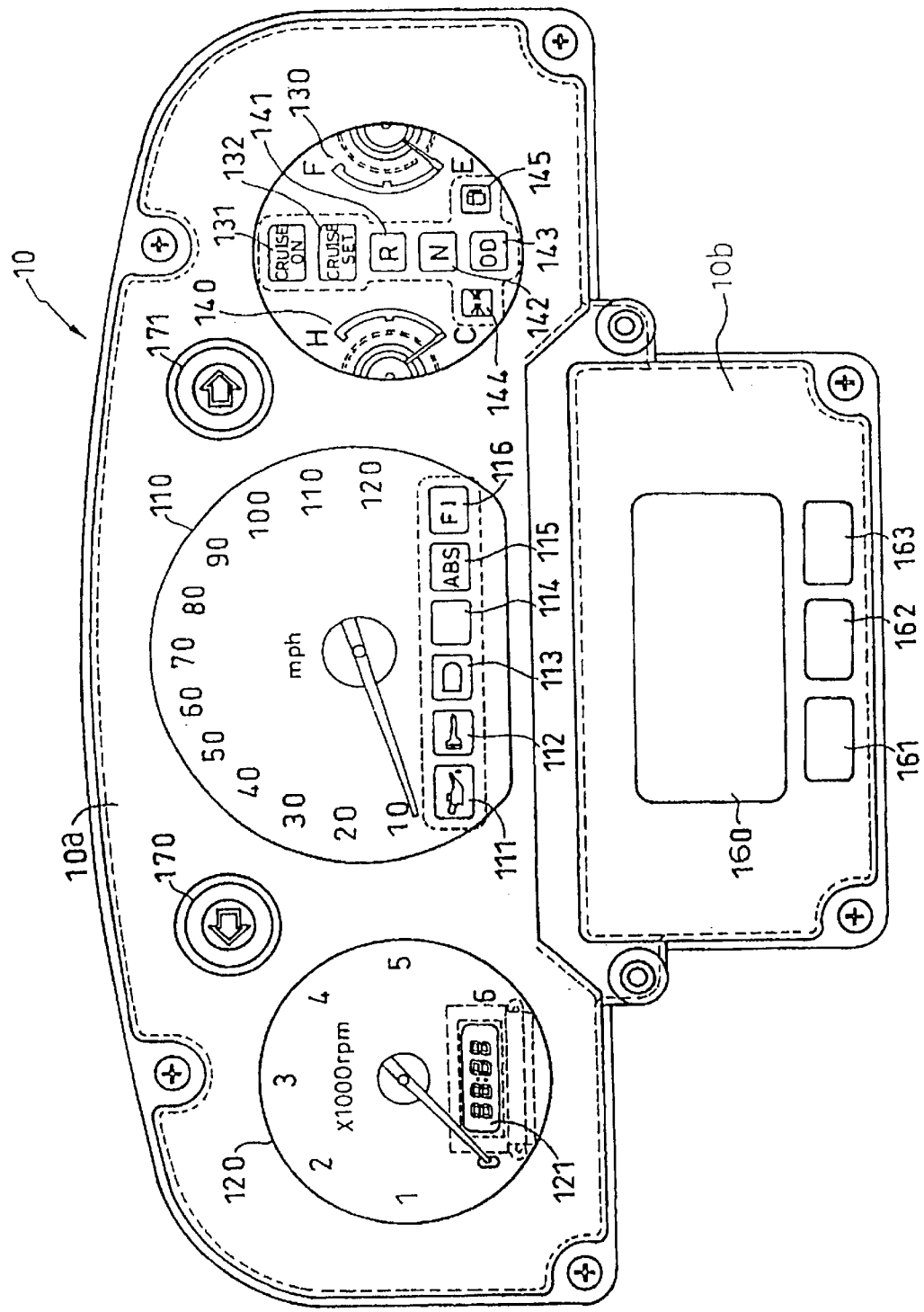
FIG. 4 is a plan view of a meter unit including the display device for vehicles according to this invention.

FIG. 4 is a plan view of the meter unit 10 as viewed from the rider's seat side of the motorcycle. The meter unit 10 of the present embodiment is comprised of an instrument panel 10a and a display device 10b unitarily formed under it.

A speedometer 110 is located at the central part of the instrument panel 10a. A tachometer 120 is disposed on the left thereof, and a fuel gauge 130 and a water temperature gauge 140 are mounted on the right thereof. Blinker indicators 170 and 171 are mounted at the upper right and left of the speedometer 110.

On the speedometer 110 are arranged an oil indicator 111, an anti-theft indicator 112, a high-beam indicator 113, a meter light adjusting light sensor 114, an ABS (anti-lock brake system) warning lamp 115, and an FI (fuel injection) warning lamp 116. Between the fuel gauge 130 and the water temperature gauge 140 are vertically arranged in one row an auto cruise indicator 131 and an auto cruise set indicator 132, and a gearshift REVERSE indicator 141, a NEUTRAL indicator 141, and an OVERDRIVE indicator 143. Furthermore, a light on-off indicator 144 is located on the left side of each gearshift indicator, and a fuel empty indicator 145 is located on the right side. A clock 121 is located in the lower part of the tachometer 120.

At the central part of the display device 10b is a display section 160, below which a mode switch 161, a trip switch 162, and a display switch 163 are located. Used in the display section 160 is a display medium, such as a dot-matrix liquid crystal panel or a cathode-ray tube (CRT), in which the display pattern is not limited.

Figure 5:
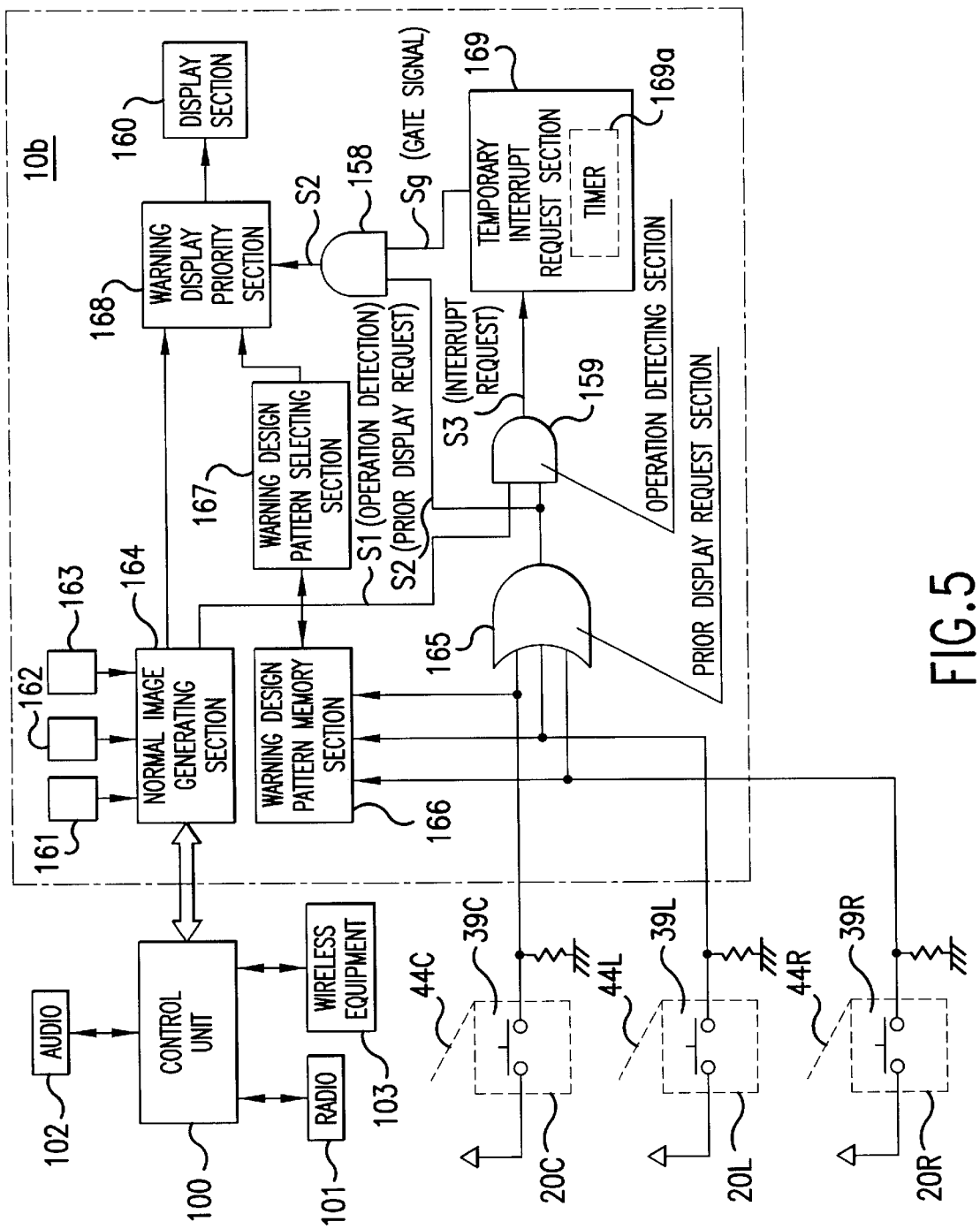
FIG. 5 is a functional block diagram showing major sections of the display device for vehicles.

FIG. 5 is a functional block diagram showing the constitution of major sections of the display device 10b. The display device 10b is connected, together with a radio receiver 101, an audio system 102, and a CB radio, to the control unit 100.

The display device 10b of the present embodiment has a function to display various kinds of information from the control unit 100, and a function to display warnings on the display section 160 by detecting output signals from the open-close sensors 39C, 39L and 39R which detect the open or closed state of the covers 44C, 44L and 44R of the trunks 20C, 20L and 20R.

Figure 7:
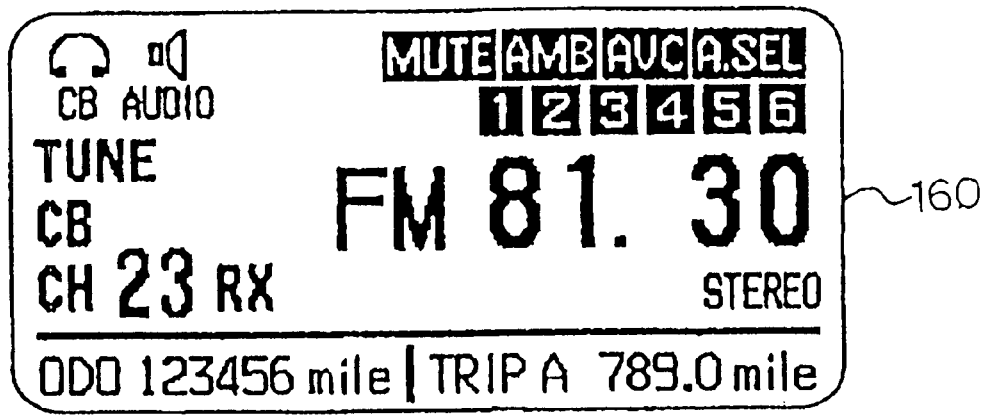
FIG. 7 is a view showing one example of a normal image (radio operation image)
Figure 8:
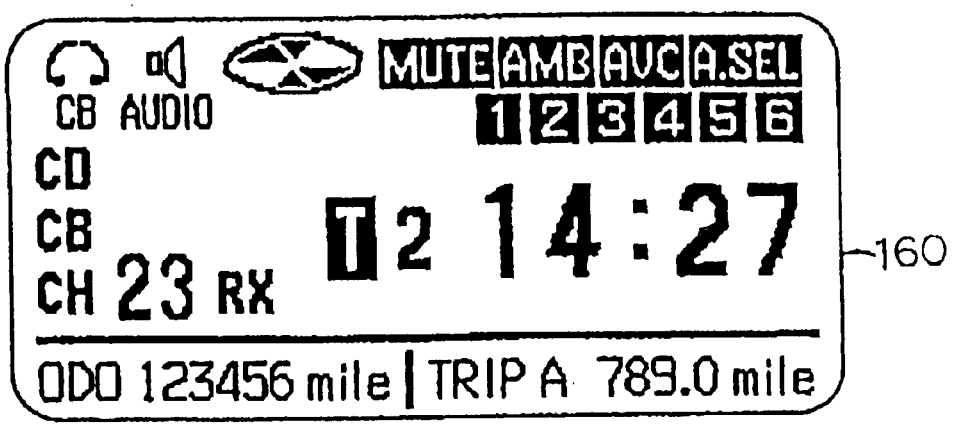
FIG. 8 is a view showing another example of a normal image (audio operation image)

A normal image generating section 164 working in connection with the control unit 100 operates in response to the operation of the switches 161, 162 and 163, generating an image of radio operations shown in FIG. 7 or a normal image of audio operations shown in FIG. 8, then outputting image data thereof. When a normal image is output in response to the operation of the switch 161 and others, an operation detection signal S1 is output. The prior display request section 165 is designed to output a prior display request signal S2 when any one of the open-close sensors 39C, 39L, and 39R has detected that the trunk cover 44 is open.

A plurality of warning design patterns are stored in a warning design pattern memory section 166 to be displayed on the display section 160 when the cover 44 of the trunk 20 is open. A warning design pattern selecting section 167 selectively reads out one of the warning design patterns stored in the warning design pattern memory section 166 on the basis of an output signal from each sensor 39, then outputs image data thereof to the warning display priority section 168.

The warning display priority section 168 normally selects the normal image generating section 164 as an image data supply source for outputting image data to the display section 160. When the prior display request signal S2 from the prior display request section 165 is detected, the image data supply source is changed over to the warning design pattern selecting section 167.

The operation detecting section 159 is for temporarily changing images on the display section 160, for example from an image of a warning design pattern of a prior display to a radio operation image when the radio is operated by the rider. When the operation detection signal S1 is detected during output of a prior display request signal S2, an interrupt request signal S3 is outputted. In other words, the interrupt request signal S3 is outputted at a request for the display of a normal image through the operation of the switch 161 when the warning design pattern is being displayed in priority on the display section 160 according to the prior display request signal S2 outputted from the prior display request section 165.

A temporary interrupt request section 169 responds to the interrupt request signal S3, outputting a gate signal Sg for a predetermined period of time preset by the timer 169a to thereby close the gate 158.

Figure 11:
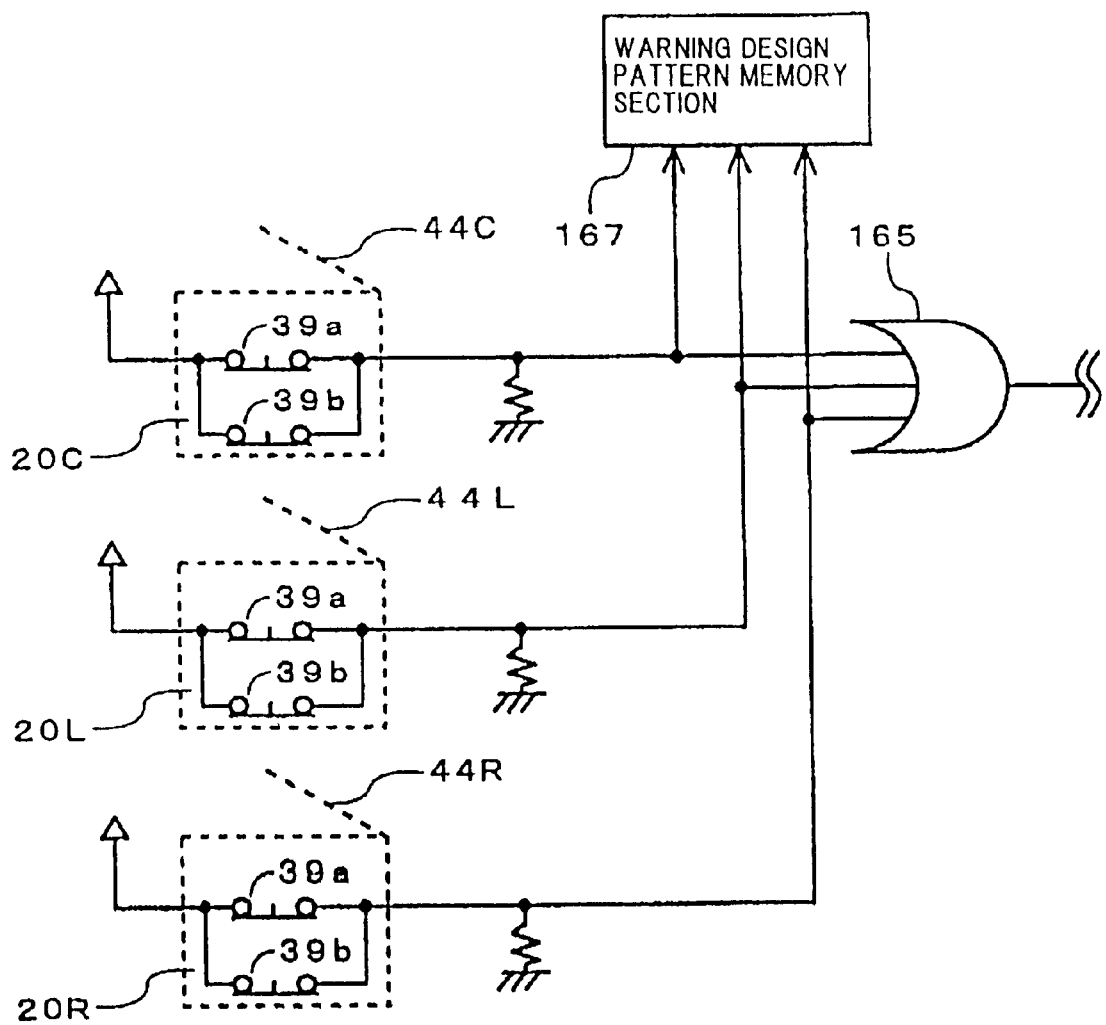
FIG. 11 is a view showing a variation of FIG. 5.

Each trunk 20 is provided with a plurality of open-close sensors 39. In FIG. 11, each open-close sensor 39 (in the drawing, two sensors: 39a and 39b) is designed to close the contact when the trunk cover 44 is in the open position. The sensors 39a and 39b are connected in parallel. According to this arrangement, the cover 44 is determined to be open so long as both the open-close sensors 39a and 39b cannot detect the closed state of the cover by each trunk 20. The sensors, therefore, can reliably detect that the cover is open.

Figure 6:
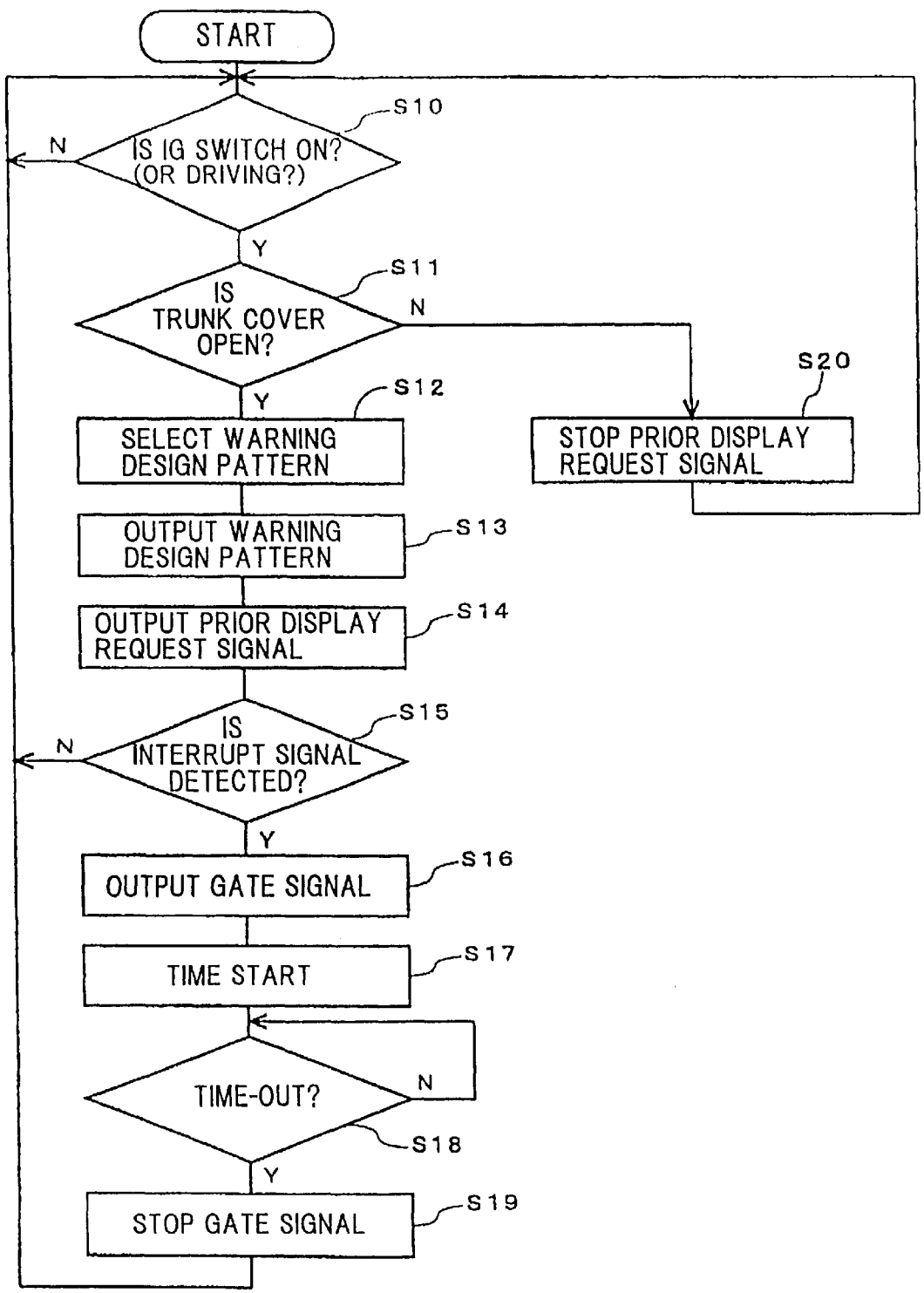
FIG. 6 is a flowchart showing operation of the display device for vehicles.

Next, operation of major sections of the display device 10b will be explained by referring to the flowchart in FIG. 6. At step S10, a decision is made whether or not the ignition (IG) switch is on, and the procedure goes to step S11 only when the IG switch is on. In this case, it is allowed to proceed to step S11 according to a decision based on the vehicle speed in place of the ignition switch position only when the vehicle is traveling.

At step S11, a decision is made whether or not the covers 44 of the trunk 20 are open according to a signal outputted from each open-close sensor 39. If either one of the covers 44 is open, at step S12, a warning design pattern corresponding to the open cover 44 is selectively read from the warning design pattern memory section 166 by means of the warning design pattern selecting section 167. At step S13, an image data of the warning design pattern thus read out is outputted to the warning display priority section 168.

At step S14, when either cover 44 is open, the open-close sensor 39 detects it, outputting a signal. The prior display request section 165 outputs the prior display request signal S2 according to the signal from the sensor 39. The prior display request signal S2 is inputted to the warning display priority section 168 through a gate 158. The warning display priority section 168, responding to the prior display request signal S2, changes the source of image data supply to the display section 160 from the normal image generating section 164 to the warning design pattern selecting section 167. As a result, the warning design pattern shown in FIGS. 9 and 10 is displayed in priority on the display section 160 in place of the normal image (FIGS. 7 and 8) that has been displayed.

Figure 9:
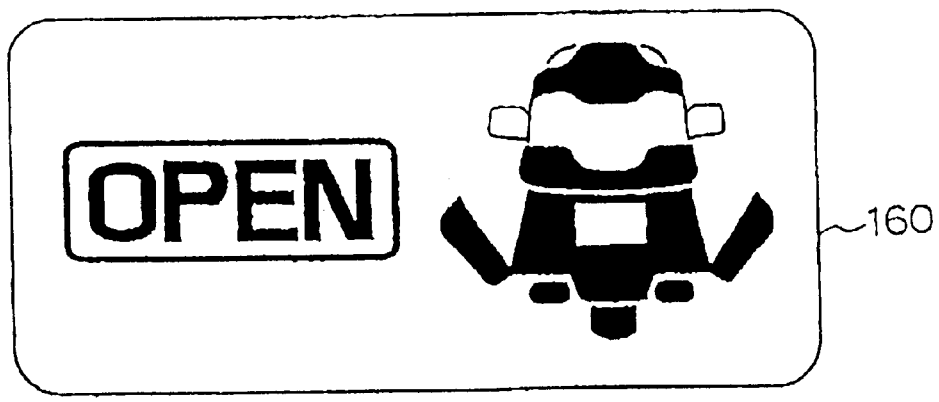
FIG. 9 is a view showing a first example of display of a warning design pattern.
Figure 10:
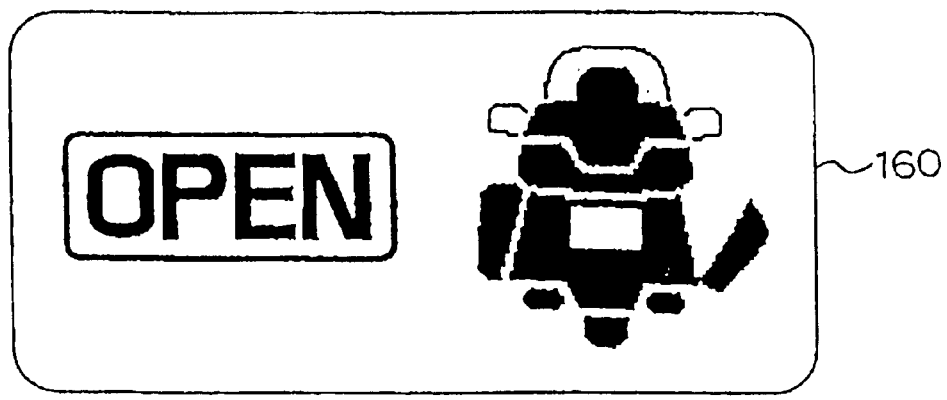
FIG. 10 is a view showing a second example of display of the warning design pattern.

The warning design patterns shown in FIGS. 9 and 10 schematically show the shape of the rear part of the vehicle shown in FIG. 3. In FIG. 9, all of the covers 44C, 44L and 44R are open. The warning design pattern is selected by the warning design pattern selecting section 167 when open positions of the covers have been detected by all of the open-close sensors 39C, 39L and 39R. In FIG. 10, only the cover 44R of the right side trunk 20R is open. This warning design pattern is selected by the warning design pattern selecting section 167 when only the open-close sensor 39R has detected that the cover is open.

According to the present embodiment, the cover 44 of the trunk 20 should not be open when the ignition switch is on, or during travel. In this case, if an open position of the cover 44 is detected, a warning design pattern indicating that the cover 44 of the trunk 20 is open will be displayed prior to the normal image that has been displayed on the display section 160. Therefore, the driver can quickly and reliably know that the cover 44 is open. If the cover 44 is in a closed position, no warning design pattern will be displayed on the display section 160. Therefore, neither the display of other information will be disturbed nor the display space for other information will be decreased.

Referring back to FIG. 6, at step S15, a decision is made whether or not the interrupt request signal S3 will be outputted from the operation detecting section 159 by the temporary interrupt request section 169. The interrupt request signal S3 will be outputted when the prior display request signal S2 is being outputted from the prior display request section 165 and also when the operation detection signal S1 is outputted from the normal image generating section 164. When the interrupt request signal S3 is being outputted, the gate signal Sg will be outputted from the temporary interrupt request section 169 at step S16.

As a result, the input of the priority request signal S2 to the warning display priority section 168 will be interrupted by the gate 158. Therefore, the warning display priority section 168 will switch the source of image data supply to the display section 160 from the current warning design pattern selecting section 167 to the normal image producing section 164. Consequently, display on the display section 160 is the normal image for example shown in FIGS. 7 and 8, by referring to which the driver can operate the radio or the audio system.

At step S17, the timer 169a of the temporary interrupt request section 169 starts. At step S18, a decision is made whether or not the preset time of the timer 169a is over. Upon the time-out, the supply of the gate signal Sg will be stopped at step S19. Therefore, in case the trunk cover 44 is still open, the prior display request signal S2 will be inputted again to the warning display priority section 168.

Therefore, the warning display priority section 168 changes the source of image data supply to the display section 160 from the current normal image producing section 164 to the warning design pattern selecting section 167. Consequently, the warning design pattern will be displayed again on the display section 160 as shown in FIGS. 9 and 10.

According to the present embodiment, if the driver operates the switch 161 or others to operate the radio and the audio system, even during the prior display of the warning design pattern, a normal image corresponding to the switch operation by the rider will be temporarily displayed, thereby enabling desired operations and settings as usual. That is, it is possible to operate the radio and the audio system even during loading or unloading with the trunk cover held open.

In the embodiment described above, either of the image data outputted from the normal image producing section 164 and the image data outputted from the warning design pattern selecting section 167 is selectively outputted to the display section 160 by the warning display priority section 168. However, it should be noted that the method of prior display of the warning design pattern is not limited thereto, and that when the open trunk cover has been detected, the display section may be divided into two regions, large and small, so that the normal image that has been displayed will be displayed in the small region while the warning design pattern will be displayed in the large region.

Upon detection of the open trunk cover, the warning design pattern will be displayed on the display section of the display device for vehicles, warning that the cover is open, prior to the information that has been displayed. Therefore, the driver can quickly and exactly know that the cover is open. When the cover is in closed position, no warning design pattern is displayed. Therefore, neither the display of other information will be disturbed nor the display space for other information will become small.

Even when the warning design pattern is being displayed as prior information on the display screen because the trunk cover is open, a normal image will be temporarily displayed correspondingly to the driver's given operation. That is, a desired operation and setting can be performed as usual.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A display device for a vehicle having a trunk fitted with a cover body, the display device comprising:
   a display device having a display section for displaying a display pattern;
   open state detecting means for detecting that the cover body is open;
   warning design pattern generating means for generating a warning design pattern for visually warning that the cover body is open;
   warning display priority means for displaying said warning design pattern on said display section prior to a display of other information when an open state of the cover body is detected;
   operation detecting means for detecting signals from a plurality of switches on said display device requiring the display of information on said display section during display of said warning design pattern; and
   interrupt request means for temporarily displaying oner of a plurality of display patterns on said display section responding to one of said signals in place of said warning design pattern when said specific operation is detected,
   wherein said plurality of switches includes a mode switch for operating an audio system.

2. The display device for a vehicle according to claim 1, wherein said display section includes a first portion for displaying said display pattern responding to said specific operation, and a second portion for displaying said warning design pattern.

3. The display device for a vehicle according to claim 1, wherein said display pattern depicts the vehicle with the cover body in an open position when said open state of the cover body is detected.

4. The display device for a vehicle according to claim 1, wherein said display section is located below a speedometer of the vehicle.

5. The display device for a vehicle according to claim 1, wherein said display section is a liquid crystal display.

6. The display device for a vehicle according to claim 1, wherein the vehicle is a two-wheeled motorcycle.

7. The display device for a vehicle according to claim 1, further comprising a compartment attached to the vehicle, and a second cover body for covering an opening of said compartment.

8. The display device for a vehicle according to claim 7, wherein said open state detecting means detects that said second cover body is open, and said warning design pattern generating means generates a second warning design pattern for visually warning that said second cover body is open.

9. A vehicle comprising:
   a vehicle body;
   a first compartment attached to said vehicle body;
   a first cover body for covering an opening of said first compartment; and
   a display device attached to said vehicle body, said display device comprising:
      a display device having a display section for displaying a display pattern;
      open state detecting means for detecting that said first cover body is open;
      warning design pattern generating means for generating a warning design pattern for visually warning that said first cover body is open; and
      warning display priority means for displaying said warning design pattern on said display section prior to a display of other information when an open state of said first cover body is detected;
      operation detecting means for detecting signals from a plurality of switches on said display device requiring the display of information on said display section during display of said warning design pattern; and
      interrupt request means for temporarily displaying one of a plurality of display patterns on said display section responding to one of said signals in place of said warning design pattern when said specific operation is detected, wherein said plurality of switches includes a mode switch for operating a radio.

10. The vehicle according to claim 9, wherein said display pattern depicts said vehicle with said first cover body in an open position when said open state of said first cover body is detected.

11. The vehicle according to claim 9, wherein said display section includes a first portion for displaying an operation display pattern indicative of a specific operation of said vehicle, and a second portion for displaying said warning design pattern.

12. The vehicle according to claim 9, wherein said display device is located below a speedometer of said vehicle.

13. The vehicle according to claim 9, wherein said display device is a liquid crystal display.

14. The vehicle according to claim 9, wherein the vehicle is a two-wheeled motorcycle.

15. The vehicle according to claim 9, wherein said first compartment is a trunk.

16. The vehicle according to claim 9, further comprising a second compartment attached to said vehicle body, and a second cover body for covering an opening of said second compartment.

17. The vehicle according to claim 16, wherein said open state detecting means detects that the second cover body is open, and said warning design pattern generating means generates a second warning design pattern for visually warning that said second cover body is open.

18. The vehicle according to claim 17, wherein said display pattern depicts said vehicle with said first cover body in an open position when said open state of said first cover body is detected, and depicts said vehicle with said second cover body in an open position when said open state of said second cover body is detected.

19. The vehicle according to claim 18, wherein said vehicle is a two-wheeled motorcycle having a speedometer, said display device comprises a liquid crystal display located below said speedometer, and said first and second compartments are trunks located at a rear of said motorcycle.

\* \* \* \* \*